(12) United States Patent
Brasch et al.

(10) Patent No.: US 6,245,310 B1
(45) Date of Patent: Jun. 12, 2001

(54) PROCESS FOR THE MANUFACTURE OF DISPERSIBLE ALUMINO-SILICATES

(75) Inventors: Andrea Brasch, Meldorf; Klaus Diblitz, Hamburg; Arnold Meyer, St. Michaelisdonn, all of (DE)

(73) Assignee: RWE-DEA Aktiengesellschaft fuer Mineraloel und Chemie, Hamburg (DE)

( * ) Notice: Subject to any disclaimer, the term of this patent is extended or adjusted under 35 U.S.C. 154(b) by 0 days.

(21) Appl. No.: 09/269,992

(22) PCT Filed: Sep. 27, 1997

(86) PCT No.: PCT/DE97/02250

§ 371 Date: Aug. 19, 1999

§ 102(e) Date: Aug. 19, 1999

(87) PCT Pub. No.: WO98/15497

PCT Pub. Date: Apr. 16, 1998

(30) Foreign Application Priority Data

Oct. 5, 1996 (DE) .............................................. 196 41 141

(51) Int. Cl.$^7$ .................................................. C01B 33/26
(52) U.S. Cl. ..................... 423/328.1; 423/328.2; 516/79
(58) Field of Search .............................. 423/328.1, 328.2; 502/60, 63, 233, 240, 235, 263; 516/79

(56) References Cited

U.S. PATENT DOCUMENTS

| | | | |
|---|---|---|---|
| 2,974,108 | * 3/1961 | Alexander | 516/79 |
| 3,933,621 | 1/1976 | White et al. | |
| 4,438,012 | * 3/1984 | Kuhling et al. | 252/131 |
| 4,590,289 | 5/1986 | Albert et al. | |
| 5,045,519 | 9/1991 | Meyer et al. | |
| 5,346,681 | 9/1994 | Pachaly et al. | |
| 5,834,572 | 11/1998 | Derleth et al. | |
| 5,883,272 | * 3/1999 | Noweck et al. | 554/163 |
| 6,030,599 | * 2/2000 | Noweck et al. | 423/600 |

FOREIGN PATENT DOCUMENTS

| | | |
|---|---|---|
| 848966 | 8/1970 | (CA) . |
| 0013497 | 7/1980 | (EP) . |
| 0669162 | 8/1995 | (EP) . |
| 2243020 | 4/1975 | (FR) . |
| 2527196 | 11/1983 | (FR) . |
| 2166971 | 5/1986 | (GB) . |

\* cited by examiner

*Primary Examiner*—Steven P. Griffin
*Assistant Examiner*—Christina Ildebrando
(74) *Attorney, Agent, or Firm*—Browning Bushman

(57) ABSTRACT

The present invention relates to a process for the manufacture of high-purity alumino-silicates which are dispersible in aqueous and/or aqueous-acidic media by hydrolysis of aluminium compounds and silicic acid compounds and hydrothermal treatment.

20 Claims, No Drawings

PROCESS FOR THE MANUFACTURE OF DISPERSIBLE ALUMINO-SILICATES

The present invention relates to a process for the manufacture of high-purity alumino-silicates which are dispersible in aqueous or aqueous-acidic media by hydrolysis of aluminium compounds and silicic acid compounds and hydrothermal treatment.

There exists a large number and wide variety of natural alumino-silicates, including many compounds having defined crystalline structures, such as muscovite, nepheline, and chabasite. When exchanging part of the silicon atoms in the reticulation of silicates for aluminium atoms, while maintaining the reticulation, zeolites are obtained.

Besides natural alumino-silicates, there are many synthetic products of this kind. Such products may be those defined by crystal chemistry or may be physical mixtures of aluminium hydroxide and silicic acids with different quantities of water. Besides physical mixtures, alumino-silicate defined by crystal chemistry may be present as well.

A customary process for preparing such alumino-silicates is the conversion of clays, such as kaolin, using silicic acid and sodium hydroxide. Another synthesis route is the cogelation of aluminium hydroxide sols with silicic acid sols followed by precipitation [cf. GB 2166971-C]. Precipitation of an aluminium salt in a silicic acid sol is known as well [cf. CA 848966-A].

The aforesaid processes have the disadvantage that the desired sols or emulsions only exist at the instant they are prepared, while the powder obtained by subsequent drying can only incompletely be dispersed or requires solvent mixtures to achieve dispersion. Another disadvantage is that the sols or emulsions prepared in this way contain large quantities of alkali metals or alkaline earth metals used for stabilising the silicic acid. Subsequent purification, e.g. by ion exchange, is incomplete and results in typical concentrations of alkali metals or alkaline earth metals of 0.1% (equal to 1,000 ppm) after purification [cf. U.S. Pat. No. 3,933,6211].

Heterogeneous catalysis requires high-purity catalyst supports containing less than 100 ppm of alkali metals and/or alkaline earth metals, particularly less than 50 ppm of sodium oxide. The preparation of such high-purity alumino-silicates using ion exchanged ortho-silicic acid is described in German patent DE 38 39 580-C1. The resultant alumino-silicates have the desired high purities, but they cannot be dispersed.

Alumino-silicates are physically/chemically not comparable with aluminium hydroxides. For instance, their surfaces have higher acidities due to the stronger Lewis acid character of silicic acid. This property is utilized for a large number of catalytic processes, such as desulfurizing, denitrification, oxidation, hydrocracking, and mild hydrocracking.

Modern catalysts often consist of many different support materials [for instance, cf. GB 2166971-C]. It is essential that the catalyst support materials be homogeneously mixed to ensure uniform compositions. Therefore, dispersible alumino-silicates offer several advantages, e.g. when used for coating substrates. This method can be used in the field of catalysis and materials coating. The explanations given hereinabove show that there is a need for dispersible high-purity alumino-silicates.

It was the object of this invention to develop a synthesis for preparing dispersible alumino-silicates which offers the following advantages:

Even after drying and conversion into powder, the alumino-silicates prepared according to the present invention shall be dispersible in aqueous solutions without addition of or treatment with organic solvents.

The alumino-silicates prepared according to the present invention shall have high purities.

The starting materials used for preparing the aforesaid compounds shall be readily available.

The price of the starting materials shall allow an economic process.

The manufacturing process shall be feasible both as a continuous and discontinuous process.

It was surprisingly found that the process described hereinbelow provides alumino-silicates which solve the problems the present invention was based on.

The instant invention relates to a process for the continuous or discontinuous manufacture of high-purity alumino-silicates which can be dispersed in aqueous and/or aqueous-acidic media. The desired properties are obtained by the following process:

Process for the manufacture of alumino-silicates which are dispersible in aqueous and/or aqueous-acidic media wherein (A) one or more hydrolyzable aluminium compound(s) is (are) hydrolyzed jointly or discontinuously in space or time, preferably jointly, and (B) said compound(s) is (are) contacted with one or more silicic acid compound(s) prior to, during, or after hydrolysis, preferably prior to or during hydrolysis, and (C) the combined compounds/reaction products are jointly subjected to hydrothermal ageing in an aqueous environment and in the presence of a monovalent organic $C_1$ to $C_6$ acid or a monovalent inorganic acid at temperatures of 40 to 220° C. for a period of more than 0.5 h during or after hydrolysis.

The hydrolysis may be carried out at 20 to 98° C., preferably 50 to 98° C., most preferably 85 to 98° C. Hydrolyzable aluminium compounds within the meaning of the instant invention are all the aluminium compounds forming Al—OH and/or Al—O—Al structures when reacted with water, e.g. aluminium alcoholates, aluminium hydroxyalcoholates, aluminium oxyalcoholates, aluminium acetyl acetonates, aluminium alkyl chlorides, or aluminium carboxylates. Preferably, the hydrolyzable aluminium compounds are compounds of the type $Al(O\text{-}R\text{-}A\text{-}R')_{3-n}(O\text{-}R'')_n$, wherein independent of each other and, optionally, different for each residue R" is a branched or an unbranched, a cyclic or an acyclic, or an aromatic hydrocarbon residue having 1 to 30, particularly 2 to 12 carbon atoms, R' is a branched or an unbranched, a cyclic or an acyclic, or an aromatic hydrocarbon residue having 1 to 10 carbon atoms, particularly an alkyl residue having 4 to 8 carbon atoms, R is a bivalent and branched or unbranched, cyclic or acyclic, or aromatic $C_1$ to $C_{10}$ hydrocarbon residue, particularly an alkyl residue having 1 to 5 carbon atoms, most preferably 1 to 3 carbon atoms, the latter one most preferably being unbranched and acyclic, A represents a heteroatom of main group 6 (oxygen group) or main group 5 (nitrogen group) of the periodic system, preferably oxygen or nitrogen, wherein, if A represents an element of main group 5, A bears hydrogen or a $C_1$ to $C_{10}$ alkyl residue or a $C_6$ to $C_{10}$ aryl-/alkyl aryl residue as additional substituent(s) for the saturation of its valences, and n is an index for the numbers 0, 1, 2, or 3.

Preferably, n is equal to 0 or equal to 3. In case n is equal to 0 and A is equal to oxygen, aluminium trisbutylene glycolates are preferred.

In case n is equal to 3, the aluminium alkoxy compounds are aluminium trisalcoholates which, with increasing preference, have $C_2$ to $C_{12}$, $C_4$ to $C_8$, or $C_6$ to $C_8$ hydrocarbon residues, the residues being saturated or unsaturated, cyclic or acyclic, branched or unbranched, or aromatic, preferably saturated. Saturated, linear $C_6$ to $C_8$ hydrocarbon residues are particularly preferred. For example, hydrolyzable aluminium alcoholates may be prepared according to the process disclosed in EP 0 111 115-A1.

Prior to use, the hydrolyzable metal compounds may be purified by distillation, filtration, or centrifugation. In the case of silicic acid, ion exchange of metal ions, particularly sodium, preferably on exchange resins containing ammonium ions, is an efficient purification method.

For the hydrothermal treatment, it is essential that an acid be present during or after hydrolysis. This acid is a monovalent organic $C_1$ to $C_6$ acid or a monovalent inorganic acid (or a monovalent mineral acid), such as HCl or $HNO_3$. The acid may also be added after hydrolysis, as long as it is present during the hydrothermal treatment. According to the present invention, the acid or an acid-forming agent is added prior to the first drying of the alumino-silicate.

Within the meaning of the present invention, monovalent organic $C_1$ to $C_6$ acids are organic compounds which have at least 1 to 6 carbon atoms and show an acid reaction in the presence of water, i.e. react as proton donators, and which can set free only one proton, referring to the acid molecule. Included in this definition are for instance acid chlorides, sulfonic acids, and other organic compounds forming —COOH or —COO⁻ groups in water.

The acid is added in quantities of 0.1 to 2.0 gram, preferably 0.2 to 0.8 gram, referring to 1 gram of solid material. Hydrothermal ageing preferably takes 1 to 22 hours. A period of 2 to 18 hours and temperatures of 80 to 130° C. have proved to be particularly efficient.

It is another outstanding feature of the process according to the present invention that, apart from the educts and products, the reaction can be performed without any organic solvent and in an essentially alcoholic/aqueous environment, an aqueous environment being preferred.

The educts $Al_2O_3$ and $SiO_2$ may be used in quantities of from 99.5 wt. %: 0.5 wt. % to 70 wt. %: 30 wt. %, preferably from 98 wt. %: 2 wt. % to 70 wt. % : 30 wt. %, each referring to the ratio of $Al_2O_3$: $SiO_2$. Furthermore, the reaction product of this invention may be calcined at temperatures of 550° C. to 1,500° C. for a period of 0.5 to 24 hours.

The dispersible alumino-silicates are useful as catalysts, catalyst supports for catalytic processes, for the manufacture of catalysts, as starting materials for ceramics, as coating materials, and as binder components and rheological modifiers in aqueous systems.

The silicic acid compounds used according to this invention are for example condensation products of orthosilicic acid, particularly the low condensation products thereof, and most preferably orthosilicic acid itself. The silicic acid compounds used according to the present invention can also be manufactured in situ by hydrolysis of silicon tetrachloride. Water is preferably used for the hydrolysis.

By the term 'dispersible alumino-silicates' as used in the present invention are meant dry and, most expediently, powdery alumino-silicates which can be dispersed in aqueous media in quantities of at least greater than 90 wt. %, preferably greater than 95 wt. %, i.e.greater than 90 wt. %, preferably greater than 95 wt. % of said products will remain dispersed after dispersion. In the experimental part described hereinbelow a method for quantifying the dispersibility is described. The resultant aqueous products can be dried using known methods, such as spray drying or by means of a rotary drier. The process for manufacturing alumino-silicates according to this invention can be carried out continuously or discontinuously.

The alumino-silicates of this invention can be dispersed using water-diluted acids, such as inorganic, monovalent acids, e.g. hydrochloric acid or nitric acid, or $C_1$ to $C_6$ organic acids, monovalent acids being preferred. The acids used for dispersion can be employed in concentrations of 0.1 to 40 wt. %, referring to the straight acid. Preferably, lower concentrations are used, i.e. from 0.1 to 5 wt. %. In some cases it is also possible to use only water for dispersion.

The compounds manufactured according to this invention can be calcined in a furnace at temperatures of preferably 550° C. to 1,500° C. for a period of preferably 3 to 24 hours. The metal oxide manufactured in this way has the requisite high purity.

Table 1, following, shows several alumino-silicates manufactured according to the present invention and their dispersibilities D.

TABLE 1

| Compound | $Al_2O_3$:$SiO_2$ [wt. %:wt. %] | $HNO_3$ [wt. %] | Ageing [h/° C.] | Dispersibility D [%] |
|---|---|---|---|---|
| 1 | 95.0:5.0 | 0.5 | 16 h/95° C. | 98 |
| 2 | 90.5:9.5 | 0.8 | 16 h/95° C. | 95 |
| 3 | 94.9:5.1 | 0.6 | 5 h/95° C. | 97 |
| 4 | 90.7:9.3 | 1.0 | 5 h/95° C. | 96 |
| 5 | 70.5:29.5 | — | 5 h/95° C. | 99 |
| A | 95.1:4.9 | 30 | — | nondispersible |
| B | 50.4:49.6 | 30 | — | nondispersible |
| C | 68.8:31.2 | 30 | 5 h/95° C. | nondispersible |

Legend:
Compounds A and B are conventionally produced alumino-silicates.
C is an alumino-silicate prepared according to this invention, including hydrothermal treatment, but without addition of an acid
A through C are reference substances; 10 weight percent of each solid alumino-silicate were dispersed
* acid for dispersion Table 2, following, shows the physical data of the alumino-silicates according to this invention in comparison with two standard alumino-silicates (A and B). The reference alumino-silicates A and B were prepared by mixing an alumina sol with silicic acid.

TABLE 2

| Compound | $Al_2O_3$:$SiO_2$ [wt. %] | Surface [m²/g] | Pore Volume [ml/g] |
|---|---|---|---|
| 1 | 95.0:5.0 | 368 | 0.50 |
| 2 | 90.5:9.5 | 409 | 0.50 |
| 3 | 94.9:5.1 | 350 | 0.49 |
| 4 | 90.7:9.3 | 364 | 0.48 |
| 5 | 70.5:29.5 | 246 | 0.11 |
| A | 95.1:4.9 | 314 | 0.54 |
| B | 50.4:49.6 | 452 | 0.60 |

The dispersible alumino-silicates manufactured according to this invention have high purities. In particular. the content of alkali metals and alkaline earth metals which have particularly adverse effects when using the aforesaid products for catalysis is very low. The results of the trace elements analysis by ICP spectroscopy are listed in Table 3. The purities listed in Table 3 can be further increased by using bidistilled water and containers made of inert materials.

TABLE 3

| Compound | Na₂O [ppm] | Li₂O [ppm] | MgO [ppm] | CaO [ppm] | TiO₂ [ppm] | Fe₂O₃ [ppm] |
|---|---|---|---|---|---|---|
| 1 | <10 | <5 | <10 | <10 | <50 | 50 |
| 2 | <10 | <5 | <10 | <10 | <50 | 34 |
| 3 | 15 | <5 | <10 | <10 | <50 | 28 |

Legend:
The concentration of other elements, such as Pb, Zn, Ni, Cr, Cu, Mn, Mo, and Ga, is less than 50 ppm in total.

EXAMPLES (General)

The compounds manufactured according to this invention were analysed for trace impurities by inductively coupled plasma (ICP) spectroscopy. The surfaces were determined by the BET method, while the pore volumes were additionally determined by mercury porosimetry (Autopore II 9220 porosimeter, Mikromeritics) and nitrogen porosimetry (Flow Prep 060, Gemini 2360, 2375, Mikromeritics). The compounds of this Invention were calcined in a muffle furnace at temperatures of between 550° C. and 1,500° C. Deionised water was used for the hydrolysis.

The dispersibility D was determined by the following method. A certain amount of the dry, solid material was placed into a beaker and mixed with dilute acid, e.g. nitric acid, while stirring. Stirring was continued for 10 minutes (stirrer speed 800–850 rpm). The suspension thus obtained was quantitatively transferred to the glass tube of a centrifuge. Subsequent to centrifugation for 20 minutes at 2,400 $rpm^{-1}$, the supernatant was decanted, and the residue in the glass tube was dried for at least 0.5 hour at 573 K (300° C.). The glass tube then was weighed including the residue, and thereafter without residue. The difference obtained is the weight of nondispersed solid.

$$\text{Nondispersed quantity}, \% = \frac{\text{gram of residue} \times 100}{\text{initial weight of alumina, in grams}}$$

Dispersed quantity $D$, % = 100 − percentage of nondispersed quantity

Example 1 (Compound 1)

Into a 2,000-ml three-neck flask, there were placed 487 grams of water and 87.7 grams of aqueous silicic acid (3.6 wt. %). The contents was heated to 75° C. A total of 500 grams of aluminium trishexanolate (6.35 wt. % Al content) were added to this mixture in three portions at time intervals of 15 minutes each. The mixture was stirred for 30 minutes. Then, 6.3 grams of 65% nitric acid were added. The alcohol was decanted and the residue was diluted to a desired solids content of about 5%. The sol was heated to 95° C. and maintained at this temperature for 16 hours. The remaining aqueous phase was liberated from alcohol residue by steam distillation, followed by spray drying.

Example 2 (Compound 2)

Into a 2,000-ml three-neck flask, there were placed 390 grams of water and 185 grams of aqueous silicic acid (3.6 wt. %). The contents was heated to 75° C. A total of 500 grams of aluminium trishexanolate (6.35 wt. % Al content) were added to this mixture in three portions at time intervals of 15 minutes each. The mixture was stirred for 30 minutes. Then, 6.7 grams of 65% nitric acid were added. The alcohol was decanted and the residue was diluted to a solids content of about 5%. The sol was heated to 95° C. and maintained at this temperature for 16 hours. The remaining aqueous phase was liberated from alcohol residue by steam distillation, followed by spray drying.

Example 3 (Compound 3)

Into a 2,000-ml three-neck flask, there were placed 490 grams of water and 78.3 grams of aqueous silicic acid (4.0 wt. %). The contents was heated to 75° C. A total of 500 grams of aluminium trishexanolate (6.3 wt. % Al content) were added to this mixture in three portions at time intervals of 15 minutes each. The mixture was stirred for 30 minutes. Then, 6.3 grams of 65% nitric acid were added. The alcohol was decanted and the residue was diluted to a solids content of about 5%. The sol was heated to 95° C. and maintained at this temperature for 5 hours. The remaining aqueous phase was liberated from alcohol residue by steam distillation, followed by spray drying.

Example 4 (Compound 4)

Into a 2,000-ml three-neck flask, there were placed 383 grams of water and 185 grams of aqueous silicic acid (3.6 wt. %). The contents was heated to 75° C. A total of 500 grams of aluminium trishexanolate (6.35 wt. % Al content) were added to this mixture in three portions at time intervals of 15 minutes each. The mixture was stirred for 30 minutes. Then, 6.7 grams of 65% nitric acid were added. The alcohol was decanted and the residue was diluted to yield a solids content of about 5%. The sol was heated to 95° C. and maintained at this temperature for 5 hours. The remaining aqueous phase was liberated from alcohol residue by steam distillation, followed by spray drying.

Example 5 (Compound 5)

Into a 2,000-ml three-neck flask, there were placed 654 grams of aqueous silicic acid (3.9 wt. %) and 67 grams of nitric acid (65 wt. %). The contents was heated to 75° C. A total of 500 grams of aluminium trishexanolate (6.3 wt. % Al content) were added to this mixture in three portions at time intervals of 15 minutes each. The mixture was stirred for 30 minutes. The sol was heated to 95° C. and maintained at this temperature for 5 hours, followed by dilution to a solids content of about 5%. The supernatant alcohol was decanted and the remaining aqueous phase was liberated from alcohol residue by steam distillation, followed by spray drying.

Example 6 (Compound 6)

Into a 2,000-ml three-neck flask, there were placed 638 grams of aqueous silicic acid which were heated to 75° C. A total of 500 grams of aluminium trishexanolate (6.35 wt. % Al content) were added in three portions at time intervals of 15 minutes each. The mixture was stirred for 30 minutes. The alcohol was decanted and the residue was diluted to a solids content of about 5%. The sol was heated to 95° C. and maintained at this temperature for 5 hours. The remaining aqueous phase was liberated from alcohol residue by steam distillation, followed by spray drying.

What is claimed is:
1. A process for manufacturing alumino-silicates that are dispersible in aqueous and/or aqueous-acidic media characterized in that:
   (a) at least one hydrolyzable aluminium compound is hydrolyzed;
   (b) prior to, during, or after hydrolysis, said aluminium compound is contacted with at least one silicic acid compound;

(c) prior to, during, or after the hydrolysis, a monovalent $C_1$ to $C_6$ acid or a monovalent inorganic acid is added to produce an acidified mixture containing said monovalent acid, said at least one silicic acid compound, and said at least one aluminium compound; and (d) the acidified mixture is hydrothermally aged in an aqueous medium in the presence of said monovalent acid at a temperature of 40 to 220° C. for a period of more than 0.5 hours to form a reaction product, using an aluminium compound-silicon compound ratio ranging from 99.5 wt. %:0.5wt. % to 70 wt. %:30 wt. % based on the ratio of $Al_2O_3$: $SiO_2$.

2. The process of claim 1 wherein there are a plurality of hydrolyzable aluminium compounds and silicic acid compounds.

3. The process according to claim 1, further comprising a step of calcinating the reaction product.

4. A process according to claim 1, characterized in that the hydrolyzable aluminium compound is a compound having formula $Al(O—R—A—R')_{3-n}(O—R'')_n$, wherein:

"R'''" is a hydrocarbon residue having 1 to 30 carbon atoms;

"R'" is a hydrocarbon residue having 1 to 10 carbon atoms;

"R" is a bivalent hydrocarbon residue having 1 to 10 carbon atoms;

"A" represents a heteroatom selected from the group consisting of the main group 6 (oxygen group) and the main group 5 (nitrogen group) of the periodic system; and "n" is an index for the numbers 0, 1, 2, or 3.

5. A process according to claim 4, characterized in that n is equal to 0.

6. A process according to claim 4, characterized in that n is equal to 3.

7. A process according to any one of claims 4, 5, or 6, characterized in that the hydrolyzable aluminium compound is an aluminium alcoholate having $C_2$ to $C_{12}$ hydrocarbon residues.

8. The process of claim 7 wherein the aluminium alcoholate has $C_4$ to $C_8$ hydrocarbon residues.

9. The process of claim 7 wherein the aluminium alcoholate has $C_6$ to $C_8$ hydrocarbon residues.

10. A process according to any one of claims 4–6, characterized in that orthosilicic acid and/or condensation products thereof are used as the silicic acid compound.

11. A process according to any one of claims 4–6, characterized in that the hydrolyzable aluminium compound is first purified by distillation, filtration, or centrifugation, and/or the silicic acid compound is liberated from metal ions by ion exchange.

12. The process of claim 11 wherein said ion exchange is carried out on an ion exchange resin containing ammonium ions.

13. A process according to any one of claims 4–6, characterized in that the hydrolysis is performed at 20 to 98° C.

14. The process of claim 13 wherein said hydrolysis is performed at 85 to 98° C.

15. A process according to any one of claims 4–6, characterized in that the monovalent acid is added after the hydrolysis and prior to or during the hydrothermal treatment.

16. A process according to any one of claims 4–6, characterized in that the hydrothermal aging is conducted for a period of 0.5 hour to 24 hours.

17. The process of claim 16 wherein said hydrothermal aging is conducted for a period of 2 to 18 hours.

18. A process according to any one of claims 4–6, characterized in that the hydrothermal aging is conducted at 80 to 130° C.

19. A process according to any of claims 4–6, characterized in that the reaction product is calcined at temperatures of between 550° C. and 1500° C. for a period of 0.5 hour to 24 hours.

20. The process of claim 4 wherein A is an element of main group 5 and A bears a hydrogen or a $C_1$ to $C_{10}$ alkyl residue, or a $C_6$ to $C_{10}$ aryl-/alkyl-aryl residue as additional substituents for saturation of its valences.

* * * * *